March 9, 1965  R. VÖLLER ETAL  3,172,303
BALANCING APPARATUS
Filed Oct. 11, 1960  2 Sheets-Sheet 1
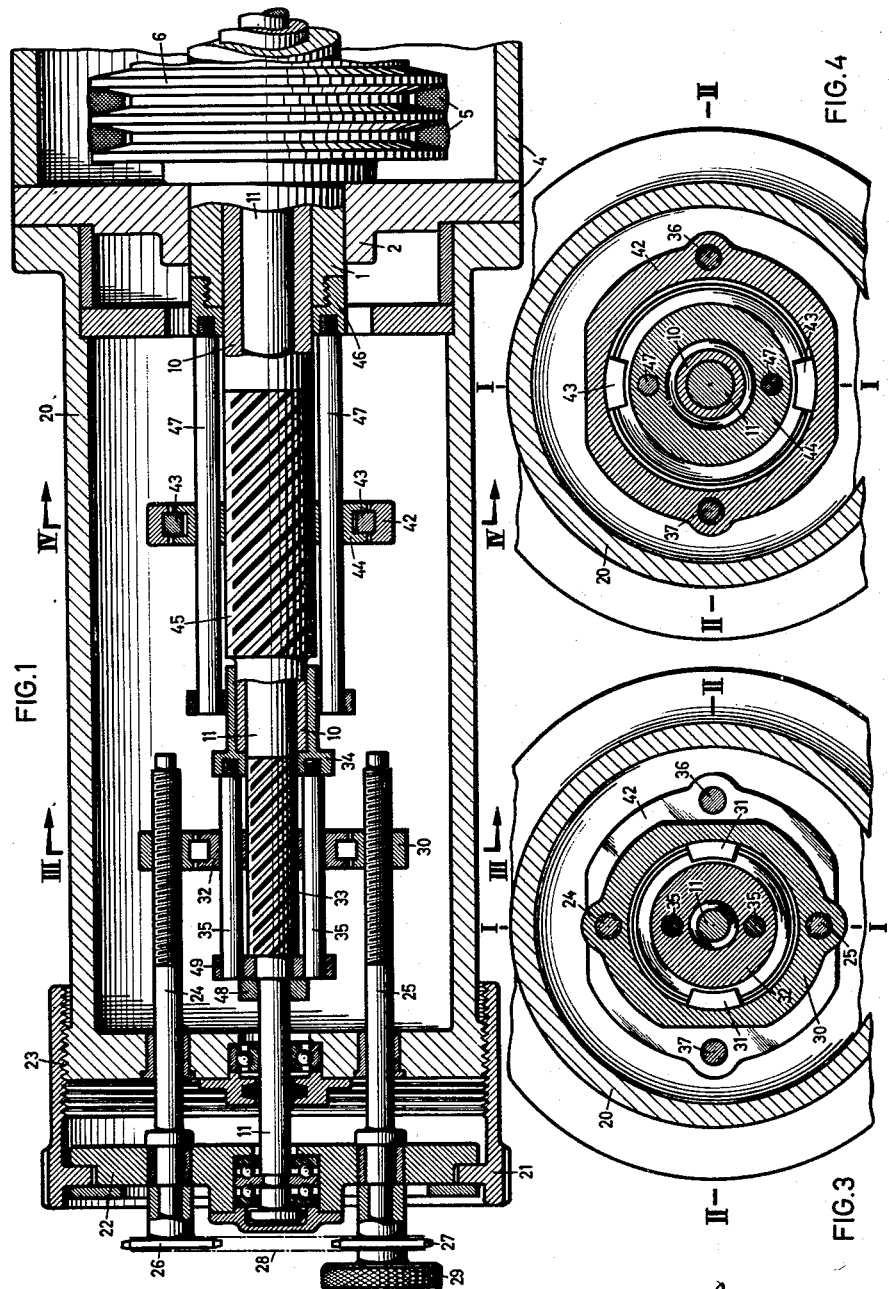

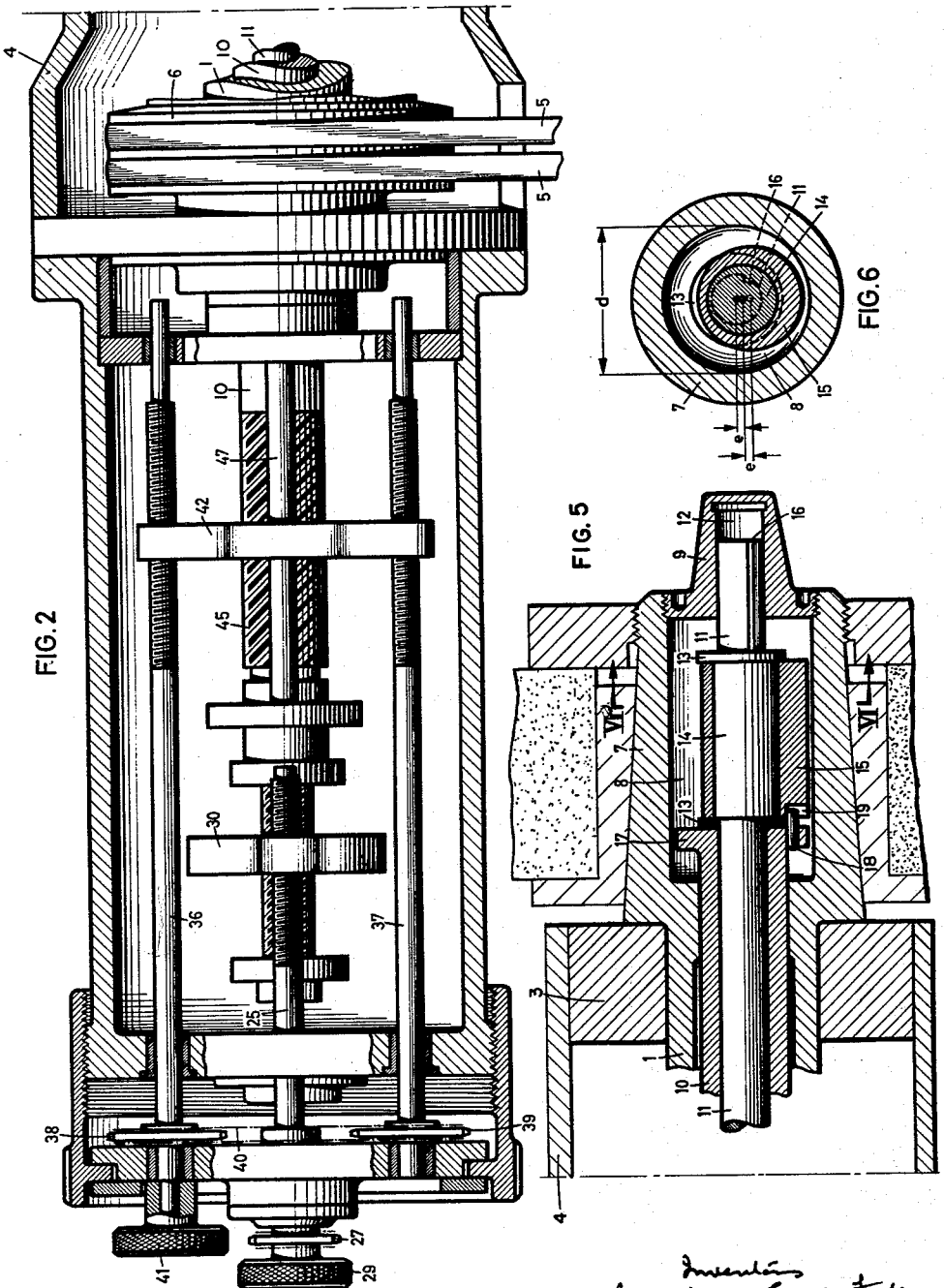

United States Patent Office 3,172,303
Patented Mar. 9, 1965

3,172,303
BALANCING APPARATUS
Rolf Völler, Dagersheim, Kreis Boblingen, Ernst Focke, Stuttgart, and Rudolf Benz, Hegnach, Kreis Waiblingen, Germany, assignors to Fortuna-Werke Spezialmaschinenfabrik A.G., Stuttgart-Bad Cannstatt, Germany
Filed Oct. 11, 1960, Ser. No. 61,873
Claims priority, application Germany, Oct. 17, 1959, F 29,635
11 Claims. (Cl. 74—573)

The present invention relates to the static and dynamic balance of rotary members such as grinding wheels and the like.

At the present time apparatus which are known for statically and dynamically balancing elements such as grinding wheels or the like suffer from several defects. Thus, a considerable amount of time and skill are required to operate the available apparatus for statically and dynamically balancing a rotary member such as a grinding wheel, and furthermore the structure used for this purpose requires a large amount of space and does not always produce the desired balance with the desired accuracy. For example, it may be found that when a grinding wheel is finally balanced it must be trued by being dressed with proper dressing tools, and because part of the grinding wheel is removed during the dressing operation, it then becomes necessary to repeat the entire balancing procedure.

It is accordingly one of the objects of the present invention to provide apparatus which will enable both dynamic and static balance to be achieved with relatively few operations which can be very easily carried out so that extremely accurate balancing is obtained with a minimum effort.

It is also an object of the present invention to provide a structure capable of statically and dynamically balancing a member such as a grinding wheel or the like and at the same time being extremely compact so that it can easily be located within a hollow spindle which supports the grinding wheel or the like for rotation.

It is another object of the present invention to provide an arrangement where the balancing weights themselves form an extremely compact assembly capable of being located without any difficulty in a hollow spindle, while the adjusting structure is located at a part of the machine where considerable free space is available so that the adjusting structure can be arranged without any difficulty and can have the desired size and relationship between its parts which is required to produce an adjustment with the desired accuracy.

It is also an object of the present invention to provide a structure which while being smaller than conventional structures for producing desired balance nevertheless can achieve the same or even superior balance without any difficulty.

With the above objects in view the present invention includes inner and outer eccentric balancing weights located within a hollow rotary spindle which carries the grinding wheel or the like which is to be balanced, and in accordance with the present invention structure is provided for angularly adjusting one of these weights with respect to the other as well as both weights as a unit with respect to the hollow spindle for achieving static balance, and in addition in accordance with the present invention a structure is provided for axially adjusting both of the balancing weights to locate the center of gravity thereof in the plane in which the center of gravity of the grinding wheel rotates so as to achieve dynamic balance.

The novel features which are considered as characteristic for the invention are set forth in particular in the appended claims. The invention itself, however, both as to its construction and its operation together with additional objects and advantages thereof, will be best understood from the following description of specific embodiments when read in connection with the accompanying drawing, in which:

FIG. 1 is a sectional elevation of part of the structure of the invention, the section of FIG. 1 being taken along line I—I of FIGS. 3 and 4;

FIG. 2 is a sectional plan view taken along line II—II of FIGS. 3 and 4;

FIG. 3 is a transverse section taken along line III—III of FIG. 1 in the direction of the arrows;

FIG. 4 is a transverse section taken along line IV—IV in the direction of the arrows in FIG. 1;

FIG. 5 is a fragmentary sectional elevation taken in the same plane as FIG. 1 but showing the hollow spindle structure which is located to the right of the structure shown in FIG. 1; and FIG. 6 is a transverse section taken along line VI—VI of FIG. 5 in the directions of the arrows.

Referring to FIG. 5, it will be seen that the hollow rotary spindle 1 which is adapted to carry the grinding wheel extends through a bearing wall 3, and the spindle supports the grinding wheel just to the right of the wall 3 which is fragmentarily illustrated in FIG. 5. The hollow spindle 1 extends to the left beyond the wall 3 and passes through a second wall 2 (FIG. 1), these walls 2 and 3 forming part of the supporting frame which supports the rotary hollow spindle 1 for rotation about its axis. Between the walls 2 and 3 the hollow spindle 1 fixedly carries the pulley assembly 6 which is engaged by the pulley belts 5 so that the pulleys 6 together with the spindle 1 can be rotated by way of the drive belts 5. The portion 7 of the hollow spindle 1 supports the grinding wheel and is located to the right of the wall 3, as viewed in FIG. 5. The portion 7 of spindle 1 has its hollow interior 8 closed off from the exterior by a plug 9 threaded into the right end of the hollow portion 7 of the spindle 1, and this plug 9 is formed with an axial bore 12 in which a free end portion of a shaft 11 is axially slidable, this free end portion of a shaft 11 being formed with an axial groove 16 extending at all times from the right end of the shaft 11, as viewed in FIG. 5, to the left beyond the plug 9 so that the air within the plug 9 can communicate freely at all times with the air within the space 8. This shaft 11 is coaxial with the spindle 1 and extends through the latter to the left beyond the wall 2 shown in FIG. 1 and all the way through to the left end portion of the apparatus illustrated in FIG. 1. Within the space 8 the shaft 11 carries a pair of washers 13, and between the washers 13 the shaft 11 has an eccentric portion 14 which forms one of the eccentric balancing weights of the invention.

This eccentric portion 14 is integral with the shaft 11 and has with respect to the common axis of the shaft 11 and the spindle 1 the eccentricity $e$ shown in FIG. 6. This inner eccentric balancing weight 14 is surrounded by an outer eccentric balancing 15 which is formed with an axial bore through which the eccentric portion 14 passes with a sliding but snug fit, and the axis of the outer eccentric balancing weight 15 is parallel to the axis of the shaft 11 and has with respect to the axis of the eccentric weight 14 an eccentricity $e$, as is also shown in FIG. 6. Thus, when all of the axes of the shaft 11, the eccentric weight 14, and the eccentric weight 15 are located in a common plane, as shown in FIG. 6, these axes will be equidistant from each other with the intermediate axis being that of the inner eccentric balancing weight 14. It has been found that the best results are achieved when the eccentricity $e$ is approximately one-twelfth of the inner diameter $d$ of the portion 7 of the spindle 1.

The shaft 11 extends slidably through a sleeve 10 which in turn extends slidably along the interior of the spindle 1 coaxially with the latter and with the shaft 11, and in the hollow space 8 the sleeve 10 terminates in a flange 17. A coupling means is provided to connect the outer balancing weight 15 to the sleeve 10 for rotary movement therewith, and this coupling means takes the form of a pin 18 fixed to the flange 17 and extending into a radial notch 19 formed in the left end face of the balancing weight 15. When the shaft 11 and the sleeve 10 turn together, both of the eccentric weights 14 and 15 turn as a unit and the center of gravity of both of these weights turns along a circle whose center is in the axis of the spindle 1, while when only the shaft 11 is turned the inner weight 14 turns with respect to the outer weight, and at this time the common center of gravity of both weights moves along a closed curve having one crest at the axis of the shaft 1, so that when the center of gravity is located at this point there will be no unbalance, and having another crest located at a maximum distance from the axis of the spindle so as to provide the maximum amount of unbalance.

A housing 20 of the adjusting structure of the invention is fixed to the wall 2 in the manner shown in FIG. 1, and the left free end of the housing 20 is provided with an exterior thread 23 on which a sleeve 21 is threaded, and this sleeve 21 is capable of being turned with respect to the housing 20 for axially adjusting the position of the sleeve 21. The sleeve 21 has an inwardly directed annular flange overlapping the outer periphery of the plate 22, and this plate 22 is fixed at its left face, as viewed in FIG. 1, to a ring which also overlaps this flange of the sleeve 21, so that when the sleeve 21 is turned the plate 22 necessarily moves axially with the sleeve 21. The left free end of the shaft 11 is rotatably supported by the control plate 22 but is axially immovable with respect thereto, as illustrated in FIG. 1. Also, two pairs of adjusting screws are rotatably supported by the control plate 22 but are axially immovable with respect thereto.

The first pair of adjusting screws 24 and 25 respectively fixedly carry sprocket wheels 26 and 27 which are inter-connected to the left of the plate 22 by sprocket chain 28, so that when the knob 29 which is fixed to the shaft 25 is turned, both of the screws 24 and 25 will be turned simultaneously. These screws 24 and 25 extend threadedly through a ring 30 which surrounds a nut 32, and this nut 32 is formed in its outer periphery with an annular groove which receives a pair of projections 31 fixed to the ring 30 and extending radially therefrom into the groove of the nut 32, so that this structure forms a means connecting the nut 32 to the ring 30 for rotary movement with respect thereto while constraining the nut 32 to shift axially with the ring 30. This nut 32 has a multiple thread of relatively large pitch cooperating with an identical multiple thread 33 formed on the shaft 11, and the pitch is such that when the nut 32 is shifted axially upon turning of the knob 29 the shaft 11 will be turned, so that in this way the inner eccentric weight 14 can be angularly adjusted. A sleeve 34 is rigidly fixed with the sleeve 10 and is fixedly connected with a pair of rods 35 which pass through bores of the nut 32, so that the latter is constrained to turn with the sleeve 10, and the left free ends of the rods 35, as viewed in FIG. 1, are fixed to a ring 49 surrounding the shaft 11 and axially positioned thereon by a collar 48.

Thus, while the nut 32 can be shifted axially with respect to the sleeve 10, it is constrained to rotate therewith, and at this time the outer periphery of the nut 32 will turn with respect to the projections 31 extending into the groove thereof. The collar 48 cooperates through the ring 49 and the rods 35 as well as the sleeve 34 with the sleeve 10 for preventing relative axial shifting of the sleeve 10 and the shaft 11.

The second pair of screws 36 and 37 respectively carry sprocket wheels 38 and 39 located to the right of the plate 22, as viewed in FIG. 2, and interconnected by a sprocket chain 40, so that when a knob 41 which is fixed to the screw 36 is turned, both of the screws 36 and 37 will be turned. These screws 36 and 37 extend threadedly through a ring 42 which surrounds a nut 44 and which is provided with projections 43 extending into a peripheral groove of the nut 44, so that in this way the nut 44 is constrained to move axially with the ring 42 but is free to rotate with respect thereto, and the nut 44 has a thread which is the same as the thread of the nut 32 and which cooperates with a thread 45 on the sleeve 10 which is a thread of the same pitch as the thread 33. A pair of rods 47 extend through parallel bores of the nut 44, are fixed at their right ends, as viewed in FIG. 1, to a ring 46 which is fixed to the spindle 1, and at their left ends the rods 47 are supported in a ring which surrounds the sleeve 34, as shown in FIG. 1. Thus, it is possible to actuate the rod or screw 36 so as to axially shift the nut 44, and this will result in turning of the sleeve 10 so as to turn the weight 15, and at this time the shaft 11 as well as the weight 14 will also turn, so that upon actuation of the knob 41, both of the weights will turn as a unit, while when the knob 29 is actuated only the inner weight 14 will be turned.

In order to provide static balance with the above-described structure, the knob 41 is actuated so as to turn both weights as a unit and thus adjust the center of gravity of both of the weights with respect to the center of gravity of the grinding wheel or the like, a suitable instrument being applied to the grinding wheel for determining when the unbalance is at a minimum. Once this point is achieved, the knob 29 is turned so as to turn only the inner weight 14 with respect to the outer weight so as to further reduce the unbalance, and when this latter unbalance is at a minimum both of the weights 14 and 15 are again turned as a unit so as to further reduce the unbalance, and after this latter adjustment is made the structure is statically balanced. Then during rotation of the grinding wheel the sleeve 23 is turned so as to act through the plate 22 on the entire assembly shown in FIG. 1 for axially shifting both of the weights 14 and 15 within the space 8, and in this way the center of gravity of both of the weights 14 and 15 can be located in the plane in which the center of gravity of the grinding wheel rotates, and in this manner dynamic balance is achieved. As was pointed out above, the screws 24, 25, 36 and 37 are incapable of moving axially with respect to the plate 22 so that when the latter is shifted axially, by turning of the sleeve 23, all these screws necessarily shift axially with the plate 22. Because of the threaded connection of the ring 30 with the screws 24 and 25 and the threaded connection of the ring 42 with the screws 36 and 37, these rings 30 and 42 necessarily move axially together with the plate 22. Because the projections 31 of the ring 30 extend into the groove of the nut 32 and because the projections 43 of the ring 42 extend into the groove of the nut 44, the nuts 32 and 44 are also constrained to shift axially with the plate 22, and because of the threaded connection of the nuts 32 and 44 respectively to the shaft 11 and the sleeve 10, it is clear that the shaft 11 and the sleeve 10 will also necessarily move axially together with the plate 22. It should be noted that the shaft 11 is in any event connected at its left end, as viewed in FIG. 1, to the plate 22 for axial movement therewith. Thus, the shaft 11 and the sleeve 10 will necessarily move axially with the plate 22 so that the eccentric weights 14 and 15 will also shift axially with the shaft 11 and the sleeve 10, and the coupling of the weight 15 to the sleeve 10 by the pin 18 and the notch 19 is not disturbed.

It will be understood that each of the elements described above or two or more together, may also find a useful application in other types of balancing structure differing from the types described above.

While the invention has been illustrated and described as embodied in static and dynamic balancing structure, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Apparatus for statically and dynamically balancing a rotary member, comprising, in combination, a hollow rotary spindle carrying the rotary member; balancing weight means in said spindle; means carried by said spindle for supporting said balancing weight means; first adjusting means operatively connected to said balancing weight means for adjusting the latter angularly to balance the rotary member statically; and second adjusting means operatively connected to said weight means for adjusting the same in direction of the axis of said hollow spindle relative thereto and the rotary member carried thereby for locating by displacement of the weight means in said direction the center of gravity of the weight means in the plane in which the center of gravity of the rotary member rotates for dynamically balancing the rotary member, whereby the rotary member may remain fixed to the hollow spindle during dynamically balancing the rotary member.

2. Apparatus for statically and dynamically balancing a rotary member, comprising, in combination, a hollow rotary spindle for carrying the rotary member; a shaft coaxial with said spindle, connected thereto for rotation therewith, and extending into the interior thereof; an inner eccentric balancing weight fixed to said shaft for rotation therewith and located in said hollow spindle, said inner eccentric balancing weight having an axis parallel to but spaced from the common axis of said shaft and spindle; an outer eccentric surrounding and turnable on said inner eccentric, said outer eccentric forming a second balancing weight and having an axis parallel to and spaced from the axis of said inner eccentric and the common axis of said shaft and spindle; first adjusting means operatively connected to said shaft and to said outer eccentric for turning both of said eccentric balancing weights as a unit as well as for turning one of said eccentric balancing weights with respect to the other about the common axis of said shaft and hollow spindle, so that said first adjusting means may be operated for statically balancing a rotary member carried by said spindle; and second adjusting means operatively connected to said shaft and outer eccentric balancing weight for axially shifting both of said eccentric balancing weights until the center of gravity thereof is in the plane in which the center of gravity of the rotary member rotates for dynamically balancing the rotary member.

3. Apparatus for statically and dynamically balancing a rotary member, comprising, in combination, a hollow rotary spindle for carrying the rotary member; a shaft coaxial with said spindle, connected thereto for rotation therewith, and extending into the interior thereof; an inner eccentric balancing weight fixed to said shaft for rotation therewith and located in said hollow spindle, said inner eccentric balancing weight having an axis parallel to but spaced from the common axis of said shaft and spindle; an outer eccentric surrounding and turnable on said inner eccentric, said outer eccentric forming a second balancing weight and having an axis parallel to and spaced from the axis of said inner eccentric and the common axis of said shaft and spindle; first adjusting means operatively connected to said shaft and to said outer eccentric for turning both of said eccentric balancing weights as a unit as well as for turning one of said eccentric balancing weights with respect to the other about the common axis of said shaft and hollow spindle, so that said first adjusting means may be operated for statically balancing a rotary member carried by said spindle; and second adjusting means operatively connected to said shaft and outer eccentric balancing weight for axially shifting both of said eccentric balancing weights until the center of gravity thereof is in the plane in which the center of gravity of the rotary member rotates for dynamically balancing the rotary member, said axes of said shaft, inner eccentric balancing weight, and outer eccentric balancing weight being equidistant from each other with the axis of said inner eccentric balancing weight located between the axis of said shaft and the axis of said outer eccentric balancing weight when all of said axes are in a common plane.

4. Apparatus for statically and dynamically balancing a rotary member, comprising, in combination, a hollow rotary spindle for carrying the rotary member; a shaft coaxial with said spindle, connected thereto for rotation therewith, and extending into the interior thereof; an inner eccentric balancing weight fixed to said shaft for rotation therewith and located in said hollow spindle, said inner eccentric balancing weight having an axis parallel to but spaced from the common axis of said shaft and spindle; an outer eccentric surrounding and turnable on said inner eccentric, said outer eccentric forming a second balancing weight and having an axis parallel to and spaced from the axis of said inner eccentric and the common axis of said shaft and spindle; first adjusting means operatively connected to said shaft and to said outer eccentric for turning both of said eccentric balancing weights as a unit as well as for turning one of said eccentric balancing weights with respect to the other about the common axis of said shaft and hollow spindle, so that said first adjusting means may be operated for statically balancing a rotary member carried by said spindle; and second adjusting means operatively connected to said shaft and outer eccentric balancing weight for axially shifting both of said eccentric balancing weights until the center of gravity thereof is in the plane in which the center of gravity of the rotary member rotates for dynamically balancing the rotary member, said axes of said shaft, inner eccentric balancing weight, and outer eccentric balancing weight being equidistant from each other with the axis of said inner eccentric balancing weight located between the axis of said shaft and the axis of said outer eccentric balancing weight when all of said axes are in a common plane and the distance between the axis of said inner eccentric balancing weight and either of the other axes, when all of said axes are in a common plane, being approximately one-twelfth the inner diameter of said hollow spindle.

5. Apparatus for statically and dynamically balancing a rotary member, comprising, in combination, a hollow rotary spindle for carrying the rotary member; a shaft coaxial with said spindle, connected thereto for rotation therewith, and extending into the interior thereof; an inner eccentric balancing weight fixed to said shaft for rotation therewith and located in said hollow spindle, said inner eccentric balancing weight having an axis parallel to but spaced from the common axis of said shaft and spindle; an outer eccentric surrounding and turnable on said inner eccentric, said outer eccentric forming a second balancing weight and having an axis parallel to and spaced from the axis of said inner eccentric and the common axis of said shaft and spindle; first adjusting means operatively connected to said shaft and to said outer eccentric for turning both of said eccentric balancing weights as a unit as well as for turning one of said eccentric balancing weights with respect to the other about the common axis of said shaft and hollow spindle, so that said first adjusting means may be operated for statically balancing a rotary member carried by said spindle; and second adjusting means operatively connected to said shaft and outer eccentric balancing weight for axially shifting both of said eccentric balancing weights until the center of gravity thereof is in the plane in which the center of gravity of the rotary member rotates for dynamically balancing the rotary member, said first adjusting means cooperating with said shaft for turning said inner eccentric balancing weight relative to said outer eccentric balancing weight and said hollow spindle and said first adjusting means cooperating with said outer eccentric balancing weight for turning the latter together with said inner eccentric balancing weight with respect to said spindle, so that said inner weight can be turned for adjusting the relative position between said inner and outer weights while said outer weight can be turned for adjusting the relative position between both of said weights and said spindle.

6. Apparatus for statically and dynamically balancing a rotary member, comprising, in combination, a hollow rotary spindle for carrying the rotary member; a shaft coaxial with said spindle, connected thereto for rotation therewith, and extending into the interior thereof; an inner eccentric balancing weight fixed to said shaft for rotation therewith and located in said hollow spindle, said inner eccentric balancing weight having an axis parallel to but spaced from the common axis of said shaft and spindle; an outer eccentric surrounding and turnable on said inner eccentric, said outer eccentric forming a second balancing weight and having an axis parallel to and spaced from the axis of said inner eccentric and the common axis of said shaft and spindle; first adjusting means operatively connected to said shaft and to said outer eccentric for turning both of said eccentric balancing weights as a unit as well as for turning one of said eccentric balancing weights with respect to the other about the common axis of said shaft and hollow spindle, so that said first adjusting means may be operated for statically balancing a rotary member carried by said spindle; and second adjusting means operatively connected to said shaft and outer eccentric balancing weight for axially shifting both of said eccentric balancing weights until the center of gravity thereof is in the plane in which the center of gravity of the rotary member rotates for dynamically balancing the rotary member, said first adjusting means cooperating with said shaft for turning said inner eccentric balancing weight relative to said outer eccentric balancing weight and said hollow spindle and said first adjusting means cooperating with said outer eccentric balancing weight for turning the latter together with said inner eccentric balancing weight with respect to said spindle, so that said inner weight can be turned for adjusting the relative position between said inner and outer weights while said outer weight can be turned for adjusting the relative position between both of said weights and said spindle, static balance being achieved exclusively by actuation of said first adjusting means and by angular adjustment of said weights with respect to each other and with respect to said spindle.

7. In an apparatus for statically and dynamically balancing a rotary member, in combination, a hollow rotary spindle for carrying a rotary member; an elongated hollow sleeve coaxial with and extending into the interior of said spindle and being turnable with respect thereto, said sleeve having a free end located in said hollow spindle and having distant from said free end a portion provided with a multiple thread of relatively large pitch; a first nut threadedly engaging said thread of said sleeve for turning the latter in response to axial movement of said first nut; a shaft coaxial with and extending through said sleeve into the interior of said spindle, said shaft having beyond said free end of said sleeve in said spindle an eccentric portion forming an inner eccentric balancing weight and having its axis parallel to but spaced from the common axis of said shaft, sleeve, and spindle, said shaft extending beyond said sleeve at the portion of the latter most distant from said spindle and said shaft having distant from said spindle and located beyond said sleeve an exterior portion provided also with a multiple thread of the same pitch as the thread of said sleeve; a second nut threadedly engaging the multiple thread of said shaft for turning the latter in response to axial movement of said second nut; an outer eccentric balancing weight surrounding and turnable on said inner eccentric balancing weight and having an axis spaced from the axis of said inner eccentric balancing weight and the axis of said shaft while being parallel to both of the latter axes; coupling means coupling said outer weight to said sleeve for rotary movement therewith; and means operatively connected to said first and second nuts for axially moving the latter with respect to said sleeve and shaft for placing said sleeve and shaft in angular positions which locate the axes of said inner and outer weights with respect to the common axis of said shaft, sleeve, and spindle at angular positions providing static balance of a rotary member carried by said spindle.

8. In an apparatus for statically and dynamically balancing a rotary member, in combination, a hollow rotary spindle for carrying a rotary member; an elongated hollow sleeve coaxial with and extending into the interior of said spindle and being turnable with respect thereto, said sleeve having a free end located in said hollow spindle and having distant from said free end a portion provided with a multiple thread of relatively large pitch; a first nut threadedly engaging said thread of said sleeve for turning the latter in response to axial movement of said first nut; a shaft coaxial with and extending through said sleeve into the interior of said spindle, said shaft having beyond said free end of said sleeve in said spindle an eccentric portion forming an inner eccentric balancing weight and having its axis parallel to but spaced from the common axis of said shaft, sleeve, and spindle, said shaft extending beyond said sleeve at the portion of the latter most distant from said spindle and said shaft having distant from said spindle and located beyond said sleeve an exterior portion provided also with a multiple thread of the same pitch as the thread of said sleeve; a second nut threadedly engaging the multiple thread of said shaft for turning the latter in response to axial movement of said second nut; an outer eccentric balancing weight surrounding and turnable on said inner eccentric balancing weight and having an axis spaced from the axis of said inner eccentric balancing weight and the axis of said shaft while being parallel to both of the latter axes; coupling means coupling said outer weight to said sleeve for rotary movement therewith; means operatively connected to said first and second nuts for axially moving the latter with respect to said sleeve and shaft for placing said sleeve and shaft in angular positions which locate the axes of said inner and outer weights with respect to the common axis of said shaft, sleeve, and spindle at angular positions providing static balance of a rotary member carried by said spindle; and means connecting said second nut to said sleeve for rotary movement therewith.

9. In an appartus for statically and dynamically balancing a rotary member, in combination, a hollow rotary spindle for carrying a rotary member; an elongated hollow sleeve coaxial with and extending into the interior of said spindle and being turnable with respect thereto, said sleeve having a free end located in said hollow spindle and having distant from said free end a portion provided with a multiple thread of relatively large pitch; a first nut threadedly engaging said thread of said sleeve for turning the latter in response to axial movement of said first nut; a shaft coaxial with and extending through said sleeve into the interior of said spindle, said shaft having beyond said free end of said sleeve in said spindle an eccentric portion forming an inner eccentric balancing weight and having its axis parallel to but spaced from the common axis of said shaft, sleeve, and spindle, said shaft extending beyond said sleeve at the portion of the latter most distant from said spindle and said shaft having distant from said spindle and located beyond said sleeve an exterior portion provided also with a multiple thread of the same pitch as the thread of said sleeve; a second nut threadedly engaging the multiple thread of said shaft for turning the latter in response to axial movement of said second nut; an outer eccentric balancing weight surrounding and turnable on said inner eccentric balancing weight and having an axis spaced from the axis of said inner eccentric balancing weight and the axis of said shaft while being parallel to both of the latter axes; coupling means coupling said outer weight to said sleeve for rotary movement therewith; means operatively connected to said first and second nuts for axially moving the latter with respect to said sleeve and shaft for placing said sleeve and shaft in angular positions which locate the axes of said inner and outer weights with respect to the common axis of said shaft, sleeve, and spindle at angular positions providing static balance of a rotary member carried by said spindle; means connecting said second nut to said sleeve for rotary movement therewith; and means connecting said first nut to said spindle for rotary movement therewith, whereby said first and second nuts, said shaft, said sleeve, and said weights all rotate as a unit with said spindle during rotary movement of the latter.

10. In an apparatus for statically and dynamically balancing a rotary member, in combination, a hollow rotary spindle for carrying a rotary member; an elongated hollow sleeve coaxial with and extending into the interior of said spindle and being turnable with respect thereto, said sleeve having a free end located in said hollow spindle and having distant from said free end a portion provided with a multiple thread of relatively large pitch; a first nut threadedly engaging said thread of said sleeve for turning the latter in response to axial movement of said first nut; a shaft coaxial with and extending through said sleeve into the interior of said spindle, said shaft having beyond said free end of said sleeve in said spindle an eccentric portion forming an inner eccentric balancing weight and having its axis parallel to but spaced from the common axis of said shaft, sleeve, and spindle, said shaft extending beyond said sleeve at the portion of the latter most distant from said spindle and said shaft having distant from said spindle and located beyond said sleeve an exterior portion provided also with a multiple thread of the same pitch as the thread of said sleeve; a second nut threadedly engaging the multiple thread of said shaft for turning the latter in response to axial movement of said second nut; an outer eccentric balancing weight surrounding and turnable on said inner eccentric balancing weight and having an axis spaced from the axis of said inner eccentric balancing weight and the axis of said shaft while being parallel to both of the latter axes; coupling means coupling said outer weight to said sleeve for rotary movement therewith; means operatively connected to said first and second nuts for axially moving the latter with respect to said sleeve and shaft for placing said sleeve and shaft in angular positions which locate the axes of said inner and outer weights with respect to the common axis of said shaft, sleeve, and spindle at angular positions providing static balance of a rotary member carried by said spindle; means connecting said second nut to said sleeve for rotary movement therewith; means connecting said first nut to said spindle for rotary movement therewith, whereby said first and second nuts, said shaft, said sleeve, and said weights all rotate as a unit with said spindle during rotary movement of the latter; and means operatively connected with the means for axially moving said first and second nuts for axially moving both of said nuts as a unit so as to axially move said shaft and sleeve as a unit and thus axially shift both of said weights with respect to said spindle for achieving dynamic balance.

11. In an apparatus for statically and dynamically balancing a rotary member, in combination, a hollow rotary spindle for carrying a rotary member; an elongated hollow sleeve coaxial with and extending into the interior of said spindle and being turnable with respect thereto, said sleeve having a free end located in said hollow spindle and having distant from said free end a portion provided with a multiple thread of relatively large pitch; a first nut threadedly engaging said thread of said sleeve for turning the latter in response to axial movement of said first nut; a shaft coaxial with and extending through said sleeve into the interior of said spindle, said shaft having beyond said free end of said sleeve in said spindle an eccentric portion forming an inner eccentric balancing weight and having its axis parallel to but spaced from the common axis of said shaft, sleeve, and spindle, said shaft extending beyond said sleeve at the portion of the latter most distant from said spindle and said shaft having distant from said spindle and located beyond said sleeve an exterior portion provided also with a multiple thread of the same pitch as the thread of said sleeve; a second nut threadedly engaging the multiple thread of said shaft for turning the latter in response to axial movement of said second nut; an outer eccentric balancing weight surrounding and turnable on said inner eccentric balancing weight and having an axis spaced from the axis of said inner eccentric balancing weight and the axis of said shaft while being parallel to both of the latter axes; coupling means coupling said outer weight to said sleeve for rotary movement therewith; means operatively connected to said first and second nuts for axially moving the latter with respect to said sleeve and shaft for placing said sleeve and shaft in angular positions which locate the axes of said inner and outer weights with respect to the common axis of said shaft, sleeve, and spindle at angular positions providing static balance of a rotary member carried by said spindle; means connecting said second nut to said sleeve for rotary movement therewith; means connecting said first nut to said spindle for rotary movement therewith, whereby said first and second nuts, said shaft, said sleeve, and said weights all rotate as a unit with said spindle during rotary movement of the latter; means operatively connected with the means for axially moving said first and second nuts for axially moving both of said nuts as a unit so as to axially move said shaft and sleeve as a unit and thus axially shift both of said weights with respect to said spindle for achieving dynamic balance, the means for axially shifting said nuts including a pair of rings surrounding said nuts, respectively, means connecting said rings to said nuts for shifting the latter axially while freeing said nuts for rotary movement with respect to said rings, a plurality of screw members some of which are threadedly connected with one of said rings and others of which are threadedly connected with the other of said rings for axially shifting said rings according to the will of the operator so as to axially shift said nuts, said screw members all being turnably supported by a plate through which said screw members respectively pass, and means cooperating with said plate for preventing axial movement of the latter with respect to said screw members as well as for axially shifting said plate so as to shift said screw members axially with said plate and thus axially shift both of said nuts simultaneously.

References Cited by the Examiner
UNITED STATES PATENTS

| | | | |
|---|---|---|---|
| Re. 20,207 | 12/36 | Simonds | 51—169 |
| 2,070,360 | 2/37 | Hudson | 51—169 |
| 2,142,021 | 12/38 | Ernst et al. | 51—169 |
| 2,238,989 | 4/41 | Bradbury | 74—573 |
| 2,507,558 | 5/50 | Dall et al. | 51—169 |
| 2,543,447 | 2/51 | Elrod | 74—573 |
| 2,882,745 | 4/59 | Comstock | 74—573 |
| 2,930,169 | 3/60 | Mohrenstein | 51—169 |

BROUGHTON G. DURHAM, *Primary Examiner.*

DON A. WAITE, *Examiner.*